United States Patent [19]
Weinstein et al.

[11] 3,749,064
[45] July 31, 1973

[54] APPARATUS FOR BATHING DOGS

[76] Inventors: Howard Weinstein, 15 Hereford Ln., New City, N.Y.; Edward C. Carenza, 94 Sanford Ave., Emerson, N.J.

[22] Filed: Apr. 17, 1972

[21] Appl. No.: 244,697

[52] U.S. Cl. .............................. 119/158, 128/365
[51] Int. Cl. ........................................ A01k 13/00
[58] Field of Search .................. 119/158, 1, 160; 128/365

[56] References Cited
UNITED STATES PATENTS

| | | | |
|---|---|---|---|
| 2,536,943 | 1/1951 | Kessel | 119/160 X |
| 3,263,653 | 8/1966 | Miller | 119/158 |
| 3,396,701 | 8/1968 | Trexler | 119/15 |

Primary Examiner—Hugh R. Chamblee
Attorney—Kenneth S. Goldfarb

[57] ABSTRACT

An apparatus for washing, drying, spraying and defleaing animals comprising a housing of transparent flexible material having an opposed pair of flexible mittens which extend into the housing and having working elements thereon for treating the coat of an animal.

10 Claims, 17 Drawing Figures

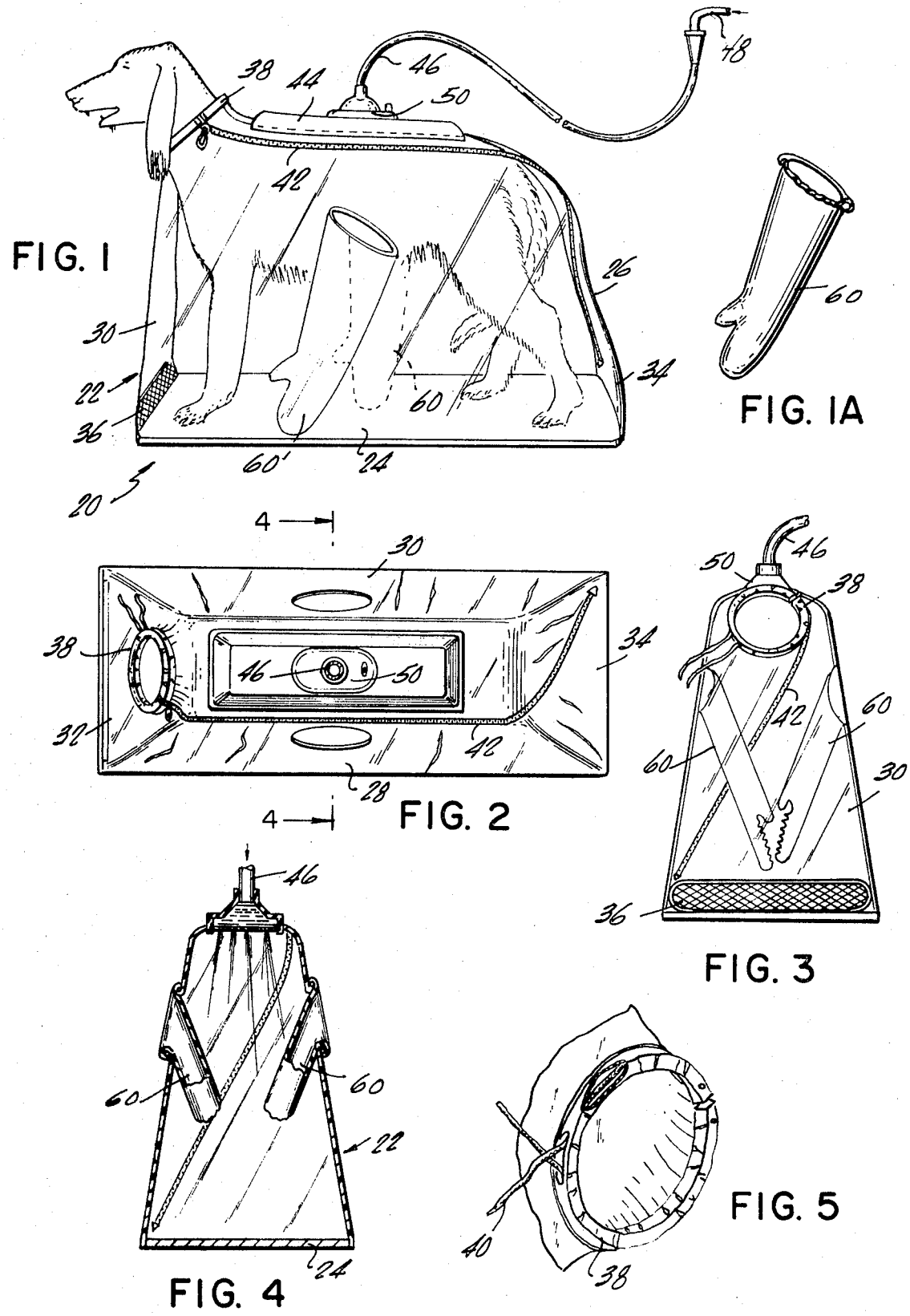

PATENTED JUL 31 1973
3,749,064
SHEET 2 OF 2
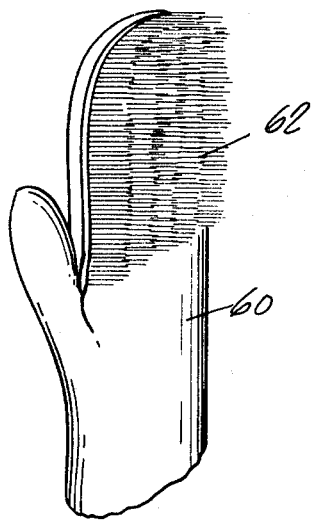
FIG. 6
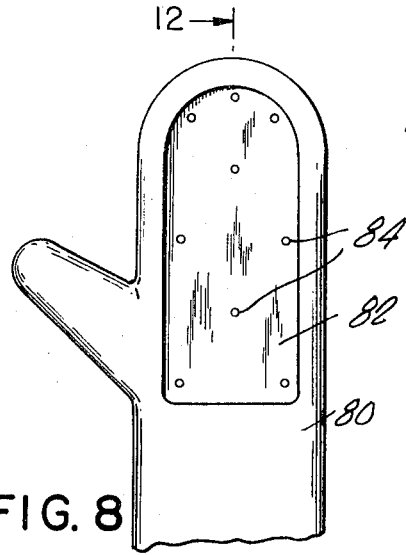
FIG. 8
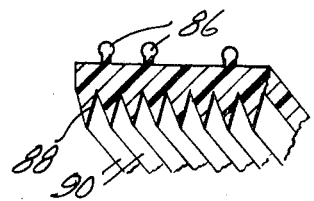
FIG. 9
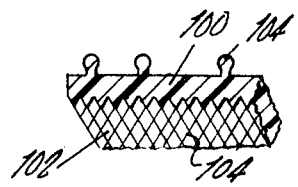
FIG. 10
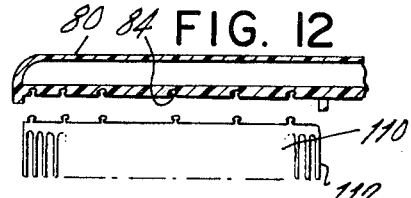
FIG. 12
FIG. 11
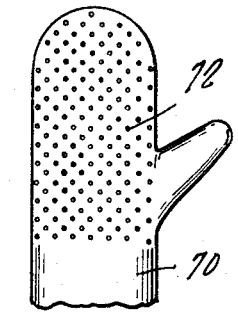
FIG. 7
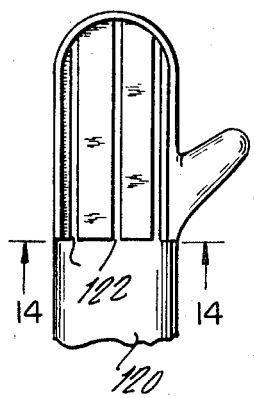
FIG. 13
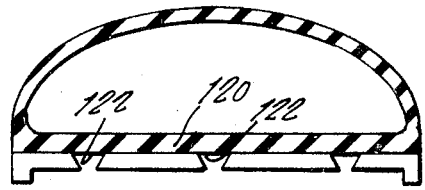
FIG. 14
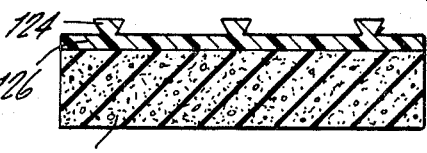
FIG. 15
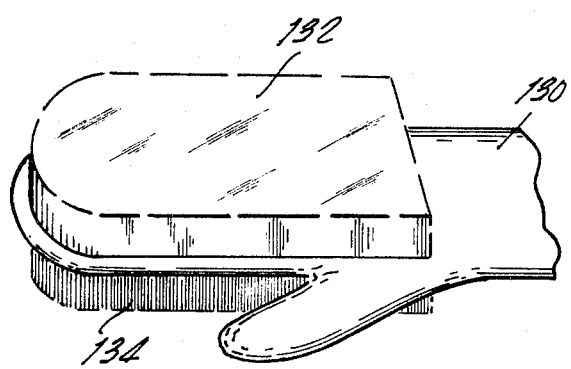
FIG. 16

APPARATUS FOR BATHING DOGS

BACKGROUND OF THE INVENTION

1. Field of the Invention

This invention relates to an apparatus for bathing dogs and more particularly to a device for washing, drying, spraying or de-fleaing a dog, including means for facilitating the washing and grooming of the dog while in the apparatus.

2. Description of the Prior Art

In the past, various types of apparatus have been devised for bathing dogs to minimize the splattering and splashing of water and to maintain the dog under restraint during such treatment. Other devices have been developed for treating both humans or animals through surgical or other medical techniques employing the use of gloves for handling the animal which is otherwise isolated. These devices particularly relate to treatment of humans or animals which are infected with contagious diseases or which have been subjected to large amounts of radiation. However, the mittens used were not supplied with any working elements for facilitating the treatment of an animal during washing, drying, and grooming thereof.

SUMMARY OF THE INVENTION

The present invention overcomes the disadvantages of the prior art devices by providing for novel arrangements of working elements and detachably mounting these elements on mittens which are attached to the housing and extent into the housing so that the animal may be scrubbed, sponged, curried, brushed, and dried entirely within the apparatus according to the invention.

It is accordingly, the primary object of the present invention to provide an apparatus having suitable mittens for engaging an animal and being provided with replaceable working elements for cleansing, scrubbing, and grooming the animal entirely within the housing.

Further objects and features of the invention reside in the provision of an apparatus for bathing dogs that is simple in construction, capable of being made out of readily available materials, and in which an animal can be securely positioned and comfortably restrained and through which all of the scrubbing, cleansing, and grooming operations can be observed while the head of the animal is entirely out of the housing so as to be capable of being petted and cared for while the operations are facilitated on its body.

It is within the concept of the present invention to utilize the present invention for the medical treatment of an animal and to restrain the animal from licking or touching wounds prior to and during treatment thereof.

These, together with various ancillary objects and features of the present invention, which will become apparent as the following description proceeds, are attained by this apparatus for bathing dogs, preferred embodiments of which are illustrated in the accompanying drawings, by way of example only, wherein:

FIG. 1 is a side perspective view of an apparatus for bathing animals in accordance with the concepts of the present invention;

FIG. 1A is a perspective view of a mitten utilized in conjunction with the invention;

FIG. 2 is a top plan view of the apparatus for bathing animals;

FIG. 3 is a front elevational view thereof;

FIG. 4 is a vertical sectional view, taken along the plane of line 4—4 in FIG. 2;

FIG. 5 is a partial perspective view illustrating the collar means utilized in the invention;

FIG. 6 is a perspective view of a portion of one of the mittens utilized in conjunction with the invention;

FIG. 7 is an elevational view of another form of mitten;

FIG. 8 is an elevational view of a mitten having means for detachably receiving a working element;

FIG. 9 is a partial perspective view of one type of working element;

FIG. 10 is a perspective view of another form of working element;

FIG. 11 is an elevational view of yet another embodiment of working element;

FIG. 12 is a sectional detail view, taken along the plane of line 12—12 in FIG. 8;

FIG. 13 is a partial elevational view of a modified form of mitten;

FIG. 14 is an enlarged sectional view, taken along the plane of line 14—14 in FIG. 13;

FIG. 15 is a sectional view of a working element adapted to be utilized in conjunction with the mitten of FIGS. 13 and 14; and FIG. 16 is a partial perspective view of another form of mitten utilized in conjunction with the invention.

DESCRIPTION OF THE PREFERRED EMBODIMENTS

With continuing reference to the accompanying drawing, wherein like reference numerals designate similar parts throughout the various views, reference numeral 20 is used to generally designate the apparatus for bathing dogs and other animals in accordance with the concepts of the present invention. The apparatus includes a housing, generally indicated at 22, having a base 24 which is preferably of relatively rigid and of reinforced strong material and which has a casing 26 including side walls 28 and 30, a front end wall 32, and a rear end wall 34, all integrally formed out of a waterproof heavy-duty strong flexible transparent material, such as polyethylene, nylon, vinyl plastic or rubberized material. The front wall 32 is provided with a nylon or mesh screen 36 to filter air to allow water to flow through to the drain of the tub or like basin in which the apparatus is deposed or onto the ground if used thusly. At the top of the front wall 32, there is provided a collar 38 in the form of a gasket-like member designed to fit around the neck of an animal and which forms an opening through which the head of an animal can extend. A draw string 40 is provided to pull the collar 38 tightly about the neck of the dog independent of the size of the dog being treated in the housing 20.

The casing 26 is provided with a slide fastener-type closure 42 which extends along the top and rear of the housing providing a closeable opening for facilitating the insertion of the dog or other animal within the housing 20. A mounting head 44 is provided along the top of the casing 26 and provides means for detachably filling a hose 46 which is designed to be connected to a faucet 48 for supplying water or other fluid to the housing 20. Of course, the hose 46 can be attached to a portable hair dryer or the like for drying the animal. A soap dispenser 50 may be provided on the mounting head 44 for dispensing soap with the water as may be desired.

One of the most important features of the present invention includes a pair of mittens each indicated by reference numeral 60 and which are attached to the casing 26 on the side walls 28 and 30 and which extend into the housing 20. The mittens 60 are each formed of a relatively strong flexible material, similar to that of the casing 26, and may themselves be transparent. The mittens are of a size and shape so as to facilitate reaching all areas of the animal to be scrubbed or the like. The mittens may have suitable brushes, as shown in FIG. 6, and indicated at 62, integrally molded thereon.

As shown in FIG. 7, a mitten 70 having molded bristles or combs 72 thereon may be employed.

In the embodiment of FIG. 8, the mitten 80 is provided with a palm member 82 having a plurality of female sockets or recesses 84 therein. There recesses 84, are designed to receive ball detents 86 of the working element, such as indicated at 88. These working elements may be integrally molded out of any suitably plastic material and may include ribs 90, in the form of a scraper for removing water from the body of the dog after it has been bathed, and for scraping any undesired coating from the coat of the dog and for otherwise treating the dog's coat. The detents 86 fit into the recesses 84.

In lieu of the scraper arrangement, as shown in FIG. 9, a file or planing surface 102 may be provided for the working element 100, which includes spherical detents or male elements 104 for reception in the sockets 84 and includes rows of teeth 106 or other suitable working surface such as sand paper, emory cloth or the like.

In lieu of the arrangement shown in FIG. 9 and FIG. 10, the working element 110 can have teeth or bristles to form a comb or brush as indicated at 112.

In the form of the invention as shown in FIGS. 13 through 15, the mitten 120 may be provided with dove-tail grooves 122 therein to receive dove-tail tongues 124 on a working element 126 which may have a sponge 128 or other suitable working element attached thereto.

In FIG. 16, there is shown a modified form of the invention including a glove or mitten 130, which has both a sponge 132 on one side thereof and a comb or brush 134 on the other side thereof. Obviously, in lieu of the sponge 130 or the brush 134 a scraper or other working element may be employed.

In use, this device may be employed to wash, dry, spray, deflea dogs or other animals indoors or outdoors. After use, the entire device may be turned inside out to clean and dry and can be folded into a small space and stored until further use.

A latitude of modification, change and substitution is intended in the foregoing disclosure, and in some instances some features of the invention will be employed without a corresponding use of other features.

We claim:

1. An apparatus for bathing animals comprising a housing having a base and an upper casing of a waterproof transparent flexible material, said casing having an opening in its top at one end thereof through which the head of an animal can extend, said casing having an opening adjacent the top thereof for facilitating the positioning of an animal in said housing, closure means for closing said opening to retain an animal in said housing, means connected to said casing at the top thereof for introducing a fluid into said housing and over an animal an opposed pair of flexible mittens secured to said casing on opposite sides thereof and extending into said housing, working elements for treating the surface of an animal, and mounting means securing said working elements to said mittens.

2. An apparatus according to claim 1, wherein said working elements comprise brushes.

3. An apparatus according to claim 1, wherein said working elements comprise sponges.

4. An apparatus according to claim 1, wherein said mounting means comprises ball detents on said working elements, said mittens having recesses therein for receiving said detents to detachably replaceably secure said working elements to said mittens 5. An apparatus according to claim 1, wherein said mounting means comprises dove-tail tongues on said working elements, said mittens having dove-tail grooves therein for receiving said tongues to detachably replaceably secure said working elements to said mittens.

6. An apparatus according to claim 1, wherein said working elements include brushes on one side of each mitten and sponges on the other side of each mitten.

7. An apparatus according to claim 1, wherein said working elements comprises scrubbers including a series of integrally scrubbing ribs.

8. An apparatus according to claim 1, wherein said working elements each comprise a base having integral rows of scrubbing teeth.

9. An apparatus according to claim 1, including flexible collar means on said casing for embracing the neck of an animal in a substantially water tight manner and for restraining movement of the animal.

10. An apparatus according to claim 9, wherein said collar means include a draw string for pulling said collar means tightly about the neck of an animal.

* * * * *